US012676814B2

(12) United States Patent
Alaettinoglu et al.

(10) Patent No.: US 12,676,814 B2
(45) Date of Patent: Jul. 7, 2026

(54) USING DIFFERENT Flex-Algo TOPOLOGIES FOR SID LIST COMPRESSION

(71) Applicant: Ciena Corporation, Hanover, MD (US)

(72) Inventors: Cengiz Alaettinoglu, Sherman Oaks, CA (US); Todd Defilippi, Redwood City, CA (US); Amal Karboubi, Ottawa (CA)

(73) Assignee: Ciena Corporation, Hanover, MD (US)

( * ) Notice: Subject to any disclaimer, the term of this patent is extended or adjusted under 35 U.S.C. 154(b) by 112 days.

(21) Appl. No.: 18/766,204

(22) Filed: Jul. 8, 2024

(65) Prior Publication Data

US 2026/0012413 A1     Jan. 8, 2026

(51) Int. Cl.
 *H04L 45/00*     (2022.01)
 *H04L 45/02*     (2022.01)

(52) U.S. Cl.
 CPC ............. *H04L 45/34* (2013.01); *H04L 45/02* (2013.01)

(58) Field of Classification Search
 CPC ...................................................... H04L 45/34
 USPC ........................................................ 709/238
 See application file for complete search history.

(56) References Cited

U.S. PATENT DOCUMENTS

| | | | |
|---|---|---|---|
| 7,120,792 | B1 | 10/2006 | Jacobson et al. |
| 7,197,573 | B1 | 3/2007 | Jacobson et al. |
| 7,539,191 | B1 | 5/2009 | Jacobson et al. |
| 8,135,834 | B1 | 3/2012 | Jacobson et al. |
| 8,274,901 | B1 | 9/2012 | Casner et al. |
| 8,422,502 | B1 | 4/2013 | Alaettinoglu et al. |

| | | | |
|---|---|---|---|
| 8,824,331 | B1 | 9/2014 | Alaettinoglu et al. |
| 8,937,946 | B1 | 1/2015 | Kanna et al. |
| 9,026,674 | B1 | 5/2015 | Kanna et al. |
| 10,033,623 | B2 | 7/2018 | Jain et al. |

(Continued)

FOREIGN PATENT DOCUMENTS

| | | |
|---|---|---|
| EP | 3 813 310 A1 | 4/2021 |
| EP | 4 138 348 A1 | 4/2021 |

(Continued)

OTHER PUBLICATIONS

P. Psenak et al., "IGP Flexible Algorithm," Internet Engineering Task Force (IETF), RFC 9350, ISSN: 2070-1721, Feb. 2023, 42 Pages.
C. Filsfils et al., "Segment Routing Architecture," Internet Engineering Task Force (IETF), Standards Track, ISSN: 2070-1721, Jul. 2018, 32 Pages.

(Continued)

*Primary Examiner* — Lan Dai T Truong
(74) *Attorney, Agent, or Firm* — Baratta Law PLLC; Lawrence A. Baratta, Jr.

(57)     ABSTRACT

Segment Identifier (SID) list compression includes receiving a calculated path in a Segment Routing network from a headend node to an end node; utilizing a compression approach to determine a segment list that, when expanded, matches the calculated path, wherein each segment in the segment list is identified by a SID, and wherein the SID is selected from any of a base topology in the Segment Routing network and any Flexible Algorithm (Flex-Algo) topologies in the Segment Routing network; and providing the segment list to the headend node. The SID list compression can further include, prior to the receiving, calculating the calculated path from the headend node to the end node based one or more constraints, wherein the SIDs are selected after the calculated path is determined without regard to any purpose of the any Flex-Algo topologies.

20 Claims, 3 Drawing Sheets

(56)　　　　References Cited

U.S. PATENT DOCUMENTS

| | | | |
|---|---|---|---|
| 11,057,278 | B1 | 7/2021 | Côté et al. |
| 11,240,145 | B2 | 2/2022 | Kashyap et al. |
| 11,356,361 | B2 * | 6/2022 | Clad ...................... H04L 63/20 |
| 2014/0369238 | A1 | 12/2014 | Alaettinoglu et al. |
| 2016/0057049 | A1 | 2/2016 | Jacobson et al. |
| 2021/0099378 | A1 | 4/2021 | Alaettinoglu et al. |
| 2022/0053072 | A1 * | 2/2022 | Filsfils .................... H04L 69/04 |
| 2022/0086078 | A1 | 3/2022 | Sivabalan et al. |
| 2022/0286395 | A1 | 9/2022 | Gandhi et al. |
| 2023/0067946 | A1 | 3/2023 | Alaettinoglu et al. |
| 2023/0095297 | A1 | 3/2023 | Alaettinoglu et al. |
| 2023/0098528 | A1 | 3/2023 | Alaettinoglu et al. |
| 2023/0146226 | A1 | 5/2023 | Sivabalan et al. |
| 2023/0171178 | A1 * | 6/2023 | Gamage .................. H04L 45/26 |
| | | | 370/252 |
| 2024/0064547 | A1 * | 2/2024 | Horn ........................ H04L 43/16 |

FOREIGN PATENT DOCUMENTS

| | | | | | |
|---|---|---|---|---|---|
| WO | 2021067231 | A1 | 4/2021 | | |
| WO | WO-2021208843 | A1 * | 10/2021 | ............. | H04L 41/00 |
| WO | 2022055861 | A1 | 3/2022 | | |
| WO | WO-2022188488 | A1 * | 9/2022 | ............. | H04L 45/12 |
| WO | WO-2023005927 | A1 * | 2/2023 | ......... | H04L 43/0829 |
| WO | 2023038818 | A1 | 3/2023 | | |

OTHER PUBLICATIONS

K. Talaulikar et al., "Border Gateway Protocol—Link State (BGP-LS) Extensions for Flexible Algorithm Advertisement," Internet Engineering Task Force (IETF), RFC 9351, Standards Track, ISSN: 2070-1721, Feb. 2023, 14 Pages.

Oct. 9, 2025, International Search Report and Written Opinion for International Patent Application No. PCT/US2025/034429.

* cited by examiner

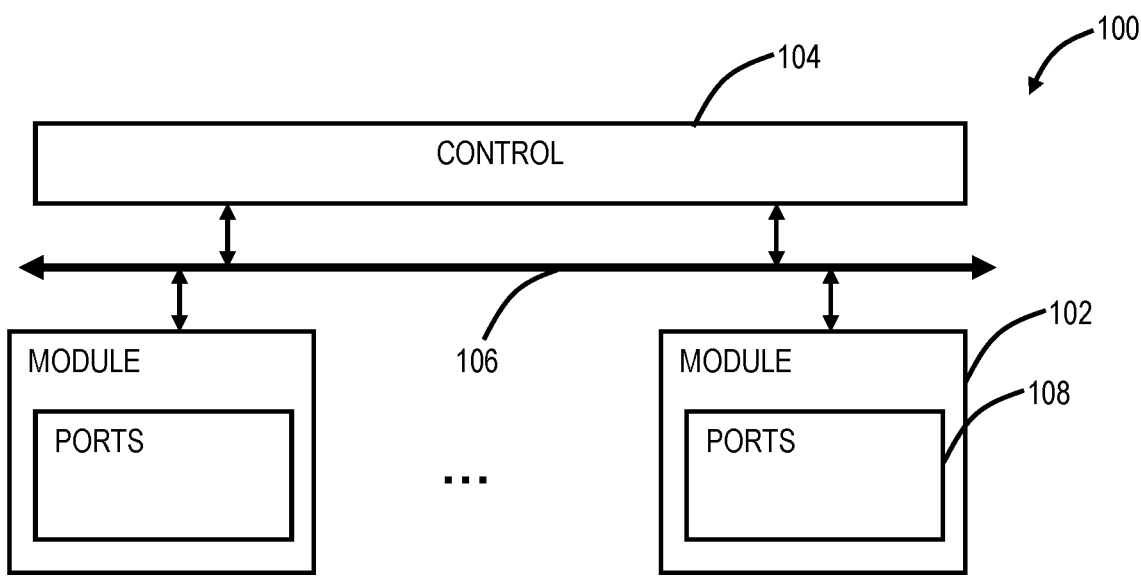
_FIG. 3_
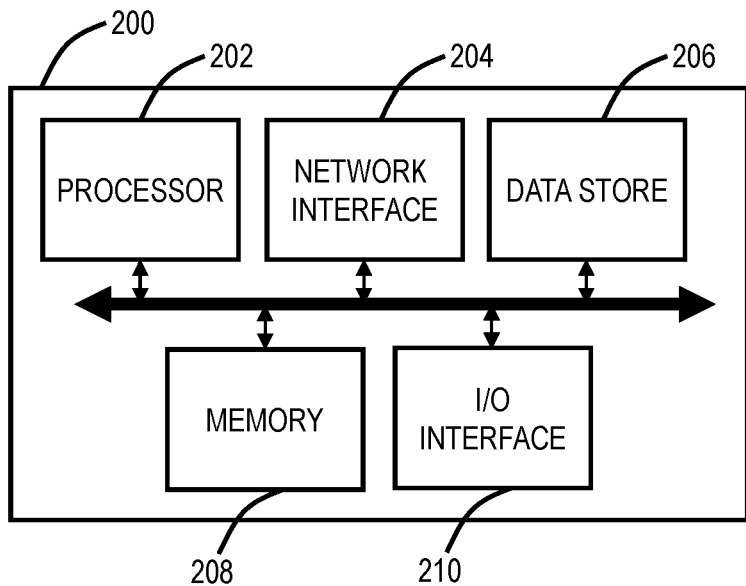
_FIG. 4_

USING DIFFERENT Flex-Algo TOPOLOGIES FOR SID LIST COMPRESSION

FIELD OF THE DISCLOSURE

The present disclosure relates generally to networking. More particularly, the present disclosure relates to systems and methods for using different Flexible Algorithm (Flex-Algo) topologies for Segment Identifier (SID) list compression in Segment Routing.

BACKGROUND OF THE DISCLOSURE

Segment Routing (SR) is a network routing technology that enables the source of a packet to define the entire route that the packet will follow through the network. This is achieved by embedding a list of instructions—known as segments—into the packet header. Each segment can represent different types of instructions such as routing decisions or specific services that need to be applied to the packet as it travels. These segments are represented by Segment Identifiers (SIDs) and can have local relevance to a specific node or be globally recognized within a Segment Routing domain. The technology simplifies the routing architecture by removing the need to maintain state information across the network, instead centralizing it at the entry point of the routing domain. Segment Routing supports various applications, including traffic engineering, service chaining, and network resiliency. This technology is detailed in Fiflsfils et al., RFC 8402, "Segment Routing Architecture," published by the Internet Engineering Task Force (IETF) in July 2018, the contents of which are incorporated by reference in their entirety.

Flexible Algorithm (Flex-Algo) is a feature within Segment Routing that provides additional customization and optimization capabilities. Flex-Algo allows network operators to define specific routing algorithms that can cater to diverse network requirements. These algorithms can be tailored based on different metrics like the shortest path, traffic engineering metrics, or delay. Operators can also set constraints, such as including or excluding certain links, to optimize the routing behavior. This feature is instrumental in enabling more efficient and flexible network traffic management, as detailed in RFC 9350, "IGP Flexible Algorithm," and RFC 9351, "Border Gateway Protocol-Link State (BGP-LS) Extensions for Flexible Algorithm Advertisement," both from February 2023, and both of which are incorporated by reference in their entirety.

BRIEF SUMMARY OF THE DISCLOSURE

The present disclosure relates to systems and methods for using different Flexible Algorithm (Flex-Algo) topologies for Segment Identifier (SID) list compression in Segment Routing. When Flex-Algo is used in conjunction with SR-Traffic Engineering (SR-TE), there are different SIDs being advertised by nodes for different Flex-Algo topologies. Overall, for different node and prefix segments in the network, there are now multiple SIDs that can be used to reach each node and prefix, with each SID using a different underlying Flex-Algo path to forward traffic to that segment. There is also a desired for SID list compression, namely using as few segments as possible to define the path, while ensuring a service remains on a calculated path, for Traffic Engineering (TE) purposes. The present disclosure provides an approach to improve SID list compression by allowing a mix and match of different SIDs, such as node SIDs, from different Flex-Algo topologies. That is, a given list of segments can include SIDs from different Flex-Algo topologies with the overall intent to minimize segment list depth. Again, different Flex-Algo topologies are established in the network for given purposes, but the present disclosure ignores the different purposes, but solely looks to use the SIDs to minimize segment list depth while guaranteeing a service is on its calculated path. In this manner, the intent is to find the fewest number of segments, across various Flex-Algo topologies, to improve SID list compression.

In various embodiments, the present disclosure includes a method having steps, an apparatus with one or more processors configured to implement the steps, a processing device configured to implement the steps, a router configured to implement the steps, and a non-transitory computer-readable medium storing instructions that, when executed, cause one or more processors to execute the steps. The steps include receiving a calculated path in a Segment Routing network from a headend node to an end node; and utilizing a compression approach to determine a segment list that, when expanded, matches the calculated path, wherein each segment in the segment list is identified by a Segment Identifier (SID), and wherein the SID is selected from any of a base topology in the Segment Routing network and any Flexible Algorithm (Flex-Algo) topologies in the Segment Routing network.

The steps can further include providing the segment list to the headend node The steps can further include, prior to the receiving, calculating the calculated path from the headend node to the end node based one or more constraints for a given purpose, wherein the SID is selected without regard to the given purpose. The segment list can include at least two SIDs from either (1) different Flex-Algo topologies of the any Flex-Algo topologies or (2) from a Flex-Algo topology of the any Flex-Algo topologies and from the base topology. The compression approach selects node SIDs from different Flex-Algo topologies of the any Flex-Algo topologies independently during each iteration. If it is not possible for the compression approach to select a node SID in a given iteration, the compression approach selects an adjacency SID.

The compression approach can be a greedy approach that selects a node SID from among all topologies that traverses furthest along the calculated path during each iteration. The compression approach can be a thorough approach that selects a node SID from among all topologies in all possible combinations to traverse along the calculated path during each iteration.

BRIEF DESCRIPTION OF THE DRAWINGS

The present disclosure is detailed through various drawings, where like components or steps are indicated by identical reference numbers for clarity and consistency.

FIG. 3 is a block diagram of a router, depicted in a simplified functional format.

FIG. 4 is a block diagram of an example processing device.

DETAILED DESCRIPTION OF THE DISCLOSURE

Figure 1:
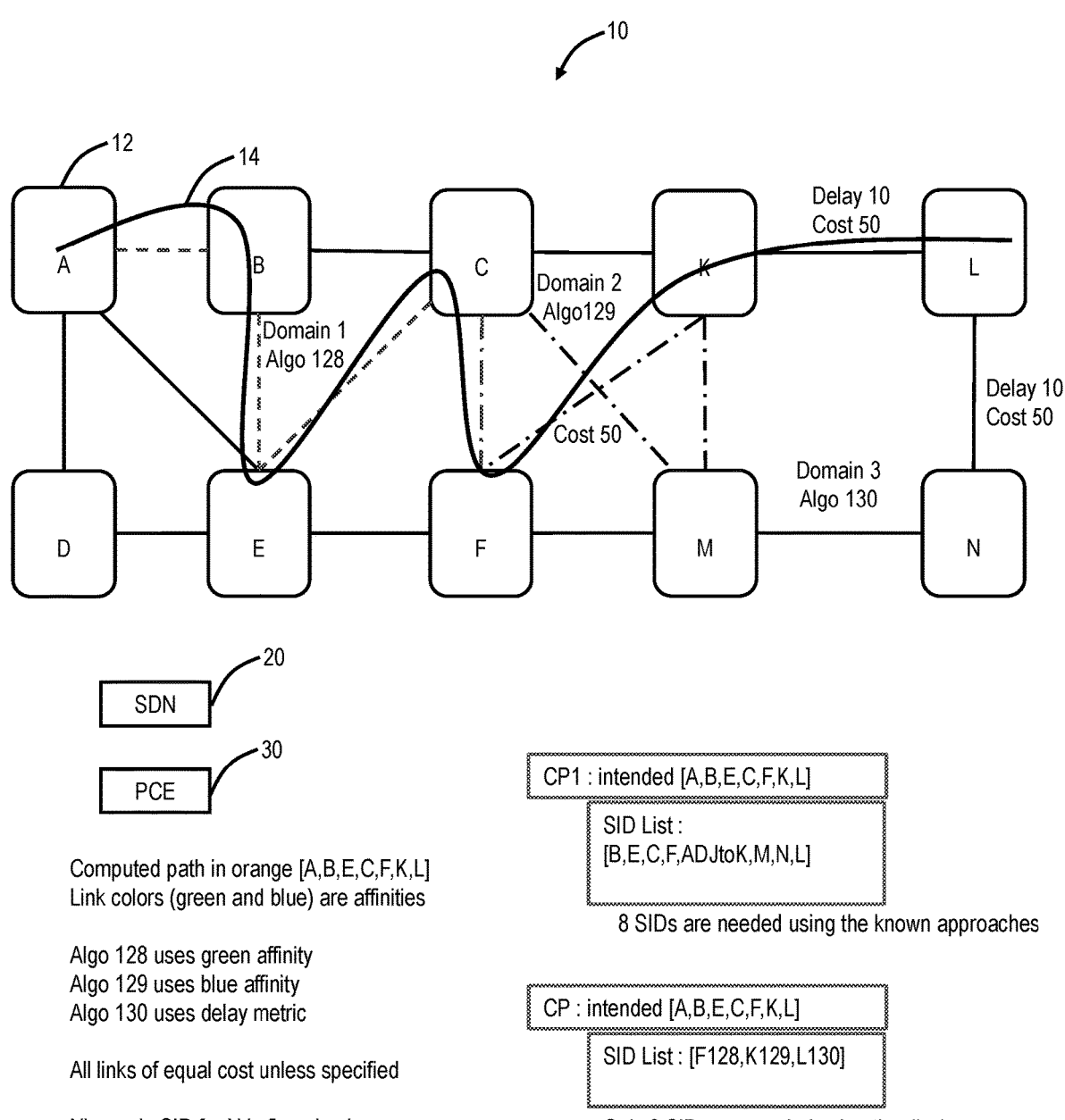
FIG. 1 is a network diagram of a network including network elements illustrating an example path.

Again, the present disclosure relates to systems and methods for using different Flexible Algorithm (Flex-Algo)

topologies for Segment Identifier (SID) list compression in Segment Routing. By allowing a Path Computation Element (PCE), headend node, etc. to choose among node SIDs from different Flex-Algo topologies during iterations of SID list compression, the present disclosure inspects all node SIDs in the network and ensures it is using node SIDs that result in a shorter segment list.

Segment Routing Overview

Segment Routing can be applied directly to Multiprotocol Label Switching (MPLS) without altering the forwarding plane. It involves encoding a segment as an MPLS label and arranging an ordered list of segments into a stack of labels. The top label of the stack represents the segment currently being processed, which is removed once completed. Segment Routing is also applicable to the Internet Protocol version 6 (IPv6) architecture by using a new routing extension header as specified in RFC 8754, which introduces the concept of an IPv6 Segment Routing Header (SRH). Here, segments are encoded as IPv6 addresses, and the processing sequence is directed by a pointer in the routing extension header. Segment Routing can extend to Ethernet standards like IEEE 802.1. It offers several advantages, such as scalable policies, ease of integration with IP and Software Defined Networking (SDN) architectures, operational simplicity, and a balance between distributed intelligence and centralized optimization.

In loose source routing like Segment Routing, the source node either selects a path or receives one from an SDN controller, PCE, etc., encoding this path in the packet header as an ordered list of segments. This routing style grants complete control over the path without relying on network state or setup signaling, making it both scalable and simple to deploy. In Segment Routing, each segment (or Segment Identifier, SID) represents a specific instruction executed by a node on incoming packets, which could include directives like forwarding to a specific interface or delivering to a particular service. SIDs come from a global block (SRGB) or a local block (SRLB) and can represent different types of segments like adjacency, prefix, node, binding, and anycast.

Each SID corresponds to a specific action, such as steering traffic through a single-hop adjacency or a multi-hop prefix route. Prefix SIDs, which can be unique within the routing domain, are associated with IP prefixes and can be configured manually or distributed via routing protocols like OSPF or ISIS. Binding segments relate to specific Segment Routing policies, where a Binding SID (BSID) is used to direct packets into these policies. An anycast segment represents a group and is used for load balancing and redundancy, directing traffic to the nearest available node in the anycast group. Segment Routing Traffic Engineering (SR-TE) restricts flows to specific paths, maintaining flow state only at the ingress nodes. It uses a path computation algorithm to optimize paths according to specific criteria, like link latency, and can be computed at the path's head-end or a PCE depending on the network's scope.

Example Network

FIG. 1 is a network diagram of a network 10 including network elements 12 (denoted as 12A-12N) illustrating an example path 14. As described herein, the network elements 12 can be nodes, switches, routers, etc. implementing Segment Routing. Assume, for illustration purposes, there is a desire to provide a path between the network elements 12A, 12L, and assume there is a specific path computation, such as for TE purposes, from the network elements 12A, 12B, 12E, 12C, 12F, 12K, 12L. This specific path computation can be performed by an SDN controller 20, a PCE 30, or the like. There is a desire that any segment list match the specific path computation, namely the network elements 12A, 12B, 12E, 12C, 12F, 12K, 12L, which is the same as the path 14. In some embodiments, the SDN controller 20 can host the PCE 30 and track available bandwidth and other TE link characteristics on a model of the network topology it maintains.

Now, for illustrating the present disclosure, the network 10 includes a base topology with a set SIDs (e.g., node SIDs, adjacency SIDs, etc.) and three example Flex-Algo topologies, labeled as Algos 128, 129, 130, each having their own set of SIDs (e.g., node SIDs, adjacency SIDs, etc.). For example, the Algo 128 can use a green affinity, the Algo 129 can use a blue affinity, and the Algo 130 can use a delay metric. Again, the present disclosure does not concern itself with the particulars defining the Flex-Algos. Rather, the present disclosure intends to make use of their SIDs. As is described herein, after the path 14 is computed, the present disclosure allows use of any of these SIDs for representing the computed path 14 in a minimal fashion.

Again, for illustration purposes, the base topology is shown with solid lines connecting the network elements 12, and the Flex-Algos 128, 129 with dotted lines. Only using the base topology, the path 14 would require eight segments—B, E, C, F, ADJtoK, M, N, L, whereas allowing use of any topology, the path 14 only requires three segments—F128, K129, L130. Of note, the example path 14 computed herein was over the base topology, i.e., the whole network, not a constrained topology. The constrained topology includes the dotted lines for a given Flex-Algo, whereas the base topology includes all links whether dotted or solid.

PCE

The PCE 30 is a processing device that handles traffic engineering in Segment Routing. The official definition of a PCE is an entity (component, application, or network node) that is capable of computing a network path or route based on a network graph and applying computational constraints. The PCE is responsible for doing the path computation and then sending appropriate label-stack (SID labels) to the headend node. Then the headend node pushes those segments list labels on the packets. An example embodiment of a PCE can include the processing device illustrated in FIG. 4. Note, the PCE can be a server, an application, a management system, a controller, etc. The present disclosure provides a SID list compaction process that can be used by the PCE 30 or some other device to assign segments to an already computed path.

SID List Compression

The present disclosure relates to SR-TE where there is an intent for a given computed path to remain on the computed path and to SID list compression where the intent is to represent the computed path with as few segments as possible. These two intents are in tension with one another, namely having fewer segments means it is more likely a path chosen by the network would veer from the computed path, and defining the path with a segment for each hop is not compressed. Note, the desire to maintain the computed path can be for TE purposes, for circuit-style paths, etc. This can lead to a very large SID stack. The headend router may not be able to push that many SIDs to the packets. Even the highest end routers have a SID depth limitation (say, e.g., on the order of 9-20 SIDs), whereas other routers may have SID depth limitations such as on the order of 3-6 SIDs. Due to hardware limitations, a shorter segment list will be preferred over a longer segment list, since some devices have a small maximum segment depth (MSD) that they support.

Again, with SR-TE, the PCE 30 will need to compress a path into a segment list so that it can be properly forwarded through an SR-TE network. One previous example of SID list compression, relative to ring topologies, is described in U.S. patent application Ser. No. 18/131,210, filed Apr. 5, 2023, and entitled "Minimal SID depth for ring topologies in Segment Routing via a PCE and Flex-Algo," the contents of which are incorporated by reference. This includes (1) creation of two Flex-Algo topologies for ring topologies (one in each direction of the ring), and (2) using these topologies to compress SID list when rings (and rings of rings) topologies are present. Here, a single node SID, from a given Flex-Algo, can be used to designate a specific path on a ring. This approach requires ring topologies and the creation of specific Flex-Algo topologies for the ring topologies.

Another example of SID list compression is described in U.S. patent application Ser. No. 18/489,328, filed Oct. 18, 2023, and entitled "Segment compaction in Segment Routing with resiliency to restoration," the contents of which are incorporated by reference. This disclosure provides an approach to determining a segment list in a Segment Routing network after a path has been determined. This segment list optimally addresses segment list depth, resilience to failure, and resilience to repair and other changes, in such a manner that the same path is achieved with the segment list. Of note, this disclosure uses a single topology for such compaction, e.g., the base topology. The present disclosure builds on this approach and expands the topologies to cover any topology, i.e., the base topology and any Flex-Algo topologies, thereby increasing the available SIDs to improve compression. We have multiple Flex-Algo topologies and their SIDs advertised throughout the network, and any of these SIDs can be used during the SID list compression, regardless of which topology was used to compute the path.

Path Calculation

The ultimate purpose of path calculation in SR-TE is to find a list of interfaces in the network between two devices that meets a set of constraints. While a Flex-Algo topology can include some of these constraints, such as which extended admin groups (EAGs) need to be included or excluded from the path calculation, there are other constraints like bandwidth for which the Flex-Algo topology is unable to account. It will still be necessary for a PCE to use a Constrained Shortest Path First (CSPF) algorithm when such constraints are present.

Of note, the present disclosure does not specify how the PCE 30 ultimately calculates the path, i.e., any approach is contemplated. The present disclosure focuses on how to compress a segment list for an already computed path.

SID List Compression

The purpose of SID list compression is to create a segment list that, when expanded, matches the path we have calculated. In the absence of any Flex-Algo topologies, with only the base topology to work with, a general SID list compression algorithm would generally include (a) from a current node that starts with the source node, traversing the computed path to determine a furthest node segment available matching a corresponding section of the computed path;

(b) if a furthest node associated with the furthest node segment is not the current node, utilizing the furthest node segment in the segment list;

(c) if the furthest node is the current node, utilizing an adjacency segment to get to a next node in the computed path; and (d) setting the current node to be the furthest node or the next node, and repeating (a)-(c) until the furthest node or the next node is the destination node.

The following pseudocode describes the general SID list compression algorithm.

```
// Given a path P from start node S to end node E and base topology
T
C = S
while (C != E) {
    N_furthest = C;
    for (N = C + 1; N <= E; ++N) {
        // Get the SPF path from C to N's node SID (which is SPF
path from C
        // to N)
        P_spf = SPFPath(T, C, N);
        // Get the section of P between C and N
        P_path = PathSection(P, C, N);
        if (P_spf == P_path) {
            N_furthest = N;
            continue;
        }
        else {
            break;
        }
    }
    if (N_furthest != C) {
        // We found the furthest node SID along P whose SPF path
still matches
        // P
        SL.push_back(GetNodeSID(T, N furthest));
    }
    else {
        // We could not find any node SID to move us along P
        SL.push_back(GetAdjSID(C, C + 1));
    }
}
```

We attempt to find the node SIDs that move us as far down our path as possible during each iteration, falling back on adjacency SIDs if no such node SIDs are possible. When the PCE 30 only has the base topology to work with, there is only one set of node SIDs in the network.

Flex-Algo SIDs

With Flex-Algo, network operators can define their own algorithms for path computation, each tailored to specific network needs or service levels. These algorithms are identified by a unique algorithm identifier and can consider a variety of metrics or constraints, such as, e.g.:

(1) Minimizing latency.

(2) Avoiding certain links or nodes (e.g., those that are over-utilized or under maintenance).

(3) Engineering traffic to meet specific security or policy requirements.

Each Flex-Algo operates as a separate instance of the routing protocol (such as IS-IS or OSPF), computing its own view of the network topology based on the criteria defined for that algorithm. This means that for each Flex-Algo, the network might appear differently:

(1) Certain links or nodes might be excluded or given different weights.

(2) Different paths might be calculated for the same source and destination based on the specific Flex-Algo used.

Importantly, each Flex-Algo assigns specific SIDs that align with its calculated topology. These SIDs direct the traffic along paths that adhere to the criteria specified by the Flex-Algo. Thus, packets can be steered through the network using SIDs that correspond to the desired Flex-Algo, allowing for sophisticated traffic engineering and optimization strategies. Again, the present disclosure does not care about the underlying purpose of a given Flex-Algo's topology. Rather, the present disclosure leverages the fact there are more SIDs available to choose from for SID list compression.

That is, the PCE 30 now has a set of additional Flex-Algo topologies, and with those additional topologies comes additional node SIDs. Though the two SIDs for the same node from the same start node both end up in that node, they may take different paths. The present disclosure uses this fact for better SID list compression. There is no requirement that all segments within a segment list use the same Flex-Algo topology; the segments in the list are resolved, in order, separately from each other and each implicitly specify which Flex-Algo topology it wants to use. More importantly, this means segments chosen in SID list compression can be mixed-and-matched over multiple Flex-Algo topologies, rather than requiring them to all come from the same Flex-Algo topology. Again, this is illustrated in FIG. 1.

There are a number of different ways in which we can mix and match the different Flex-Algo topologies, any of which are contemplated herewith. For illustration purposes, we look at a couple here along with their computational complexity, as measured in the worst-case number of Shortest Path First (SPF) calculations needed. For reference, the base topology algorithm listed above is O(H), where H is the number of hops in the path being compressed.

Greedy Algorithm

This is similar to the general SID list compression algorithm described herein, except at each point where the PCE 30 iterates through node N in path P to find N_furthest, it will now check SPF paths from C to N in all Flex-Algo topologies, rather than in just the base topology. Instead of limiting itself to how far the base topology's SIDs can take it down the path, the PCE 30 now wants to look at all Flex-Algo topologies and see which one has a node SID that will take it the furthest.

If the PCE 30 finds such a node SID, the PCE can follow it to N_matched, set C to N_matched, and continue from there. The process is repeated until we reach the end, and at each iteration a different flex-algo topology may be used. In this greedy algorithm, the PCE 30 still needs to perform SPFs at each iteration, but now the PCE 30 needs to do them for every Flex-Algo topology, not just the base topology. As a result, the complexity is O(H*A), where A is the number of Flex-Algo topologies.

The following pseudocode describes the greedy algorithm.

```
// Given a path (P) from start node (S) to end node (E) with a set
of Flex-Algo
// topologies (FA).
C = S
while (C != E) {
    N_furthest = C;
    FA_furthest = null;
    for (N = C + 1; N <= E; ++N) {
        FA_matched = null;
        // For each Flex-Algo topology
        for (fa = 0; fa <= size(FA); ++fa) {
            FA_fa = FA[fa];
            // Get the SPF path from C to N's node SID in FlexAlgo
FA_fa
            P_spf = SPFPath(FA_fa, C, N);
            // Get the section of P between C and N
            P_path = PathSection(P, C, N);
            if (P_spf = P_path) {
                FA_matched = FA_fa;
                break;
            }
            else {
                continue;
            }
        }
```

-continued

```
        if (FA_matched != null) {
            N_furthest = N;
            FA_furthest = FA_matched;
            continue;
        }
        else {
            break;
        }
    }
    if (N_furthest != C) {
        // We found the furthest node SID along P whose SPF path
still matches
        // P
        SL.push_back(GetNodeSID(FA_furthest, N_furthest));
    }
    else {
        // We could not find any node SID to move us along P
        SL.push_back(GetAdjSID(C, C + 1));
    }
}
```

Thorough Algorithm

The greedy algorithm places importance on traversing as far down the path on a single node-SID as possible. This may be short-sighted, however, as an initial long traversal on one node SID may then be followed by a set of single-hop node SIDs or adjacency SIDs that result in a long overall segment list. The PCE 30 may have been better served to make a shorter initial jump, as another intermediate node may have found a node SID that got the PCE closer to or all of the way to the end of the path. Even though the first jump was not as far, the overall segment list was shorter.

To do this, we adapt our algorithm to hold a heap of partial segment lists that we have found thus far, all at various stages of progress along path P. We pop one such segment list SL off of the heap and determine what node the segment list ends at, setting that to the current node C for the current iteration. We do the traversal step independently for each Flex-Algo topology, seeing what segment the PCE 30 chooses for that Flex-Algo topology to get itself as far along path P as possible; for each Flex-Algo topology, we add this new segment to the segment list and add this new segment list SL_fa back to the heap, so that subsequent iterations can take it further down path P. We stop once each segment list has reached the end node E. We will end up with a set of the segment lists SLResultSet, of which we then pick the shortest segment list.

The complexity for this algorithm is O(A^H), as at each node the PCE 30 needs to choose among A Flex-Algo topologies, and this branching results in an exponential number of branches on the way to the end of the path. This complexity is acceptable since H for all practical purposes is a constant.

The PCE 30 may be able to implement some minor optimizations to this algorithm. One would be to track the shortest overall full segment list found thus far in SLResultSet and stop any further work on the current partial segment list SL if it is already longer than the shortest full segment list. It may also be possible to cache all of the segments we find for all Flex-Algo topologies at each current node C, since any other iterations at C will be able to re-use those same calculations. Another worthy optimization is to keep the heap sorted with respect the SID count. In this case, the algorithm can stop after the first SL that reaches the end node E.

The following pseudocode describes the thorough algorithm.

```
// Given a path (P) from start node (S) to end node (E) with a set
of Flex-Algo
// topologies (FA)
SLWorkHeap = { }
SLResultSet = { }
while (!SLWorkHeap.empty( )) {
    SL = SLWorkHeap.pop( );
    // See which node this segment list has gotten us to
    C = GetLastNode(SL);
    // Stop and add to result set if already at end
    if (C == E) {
        SLResultSet.add(SL);
        continue;
    }
    for (fa = 0; fa <= size(FA); ++fa) {
        FA_fa = FA[fa];
        SL_fa = SL;
        N_furthest = C;
        for (N = C + 1; N <= E; ++N) {
            // Get the SPF path from C to N's node SID in FlexAlgo
FA_fa
            P_spf = SPFPath(FA_fa, C, N);
            // Get the section of P between C and N
            P_path = PathSection(P, C, N);
            if (P_spf == P_path) {
                N_furthest = N;
                continue;
            }
            else {
                break;
            }
        }
        if (N_furthest != C) {
            // We found the furthest node SID along P whose SPF
path still
            // matches P
            SL_fa.push_back(GetNodeSID(FA_fa, N_furthest));
        }
        else {
            // We could not find any node SID to move us along P
            SL_fa.push_back(GetAdjSID(C, C + 1));
        }
        SLWorkHeap.push(SL_fa);
    }
}
SLResult = GetShortest(SLResultSet);
```

There are other possible heuristics that make use of a combination of the two above algorithms. At each decision point along the path, the algorithm can choose whether it wants to make a greedy choice, in which a single node SID is chosen to get to a later point in the path, or a thorough choice, in which cases there are multiple decisions branches, each with its own node SID to get to a later point in the path. The tradeoff is computation complexity, in which case the greedy choice is better, versus the chance of a shorter overall segment list, in which case the thorough choice is better.

Process

Figure 2:
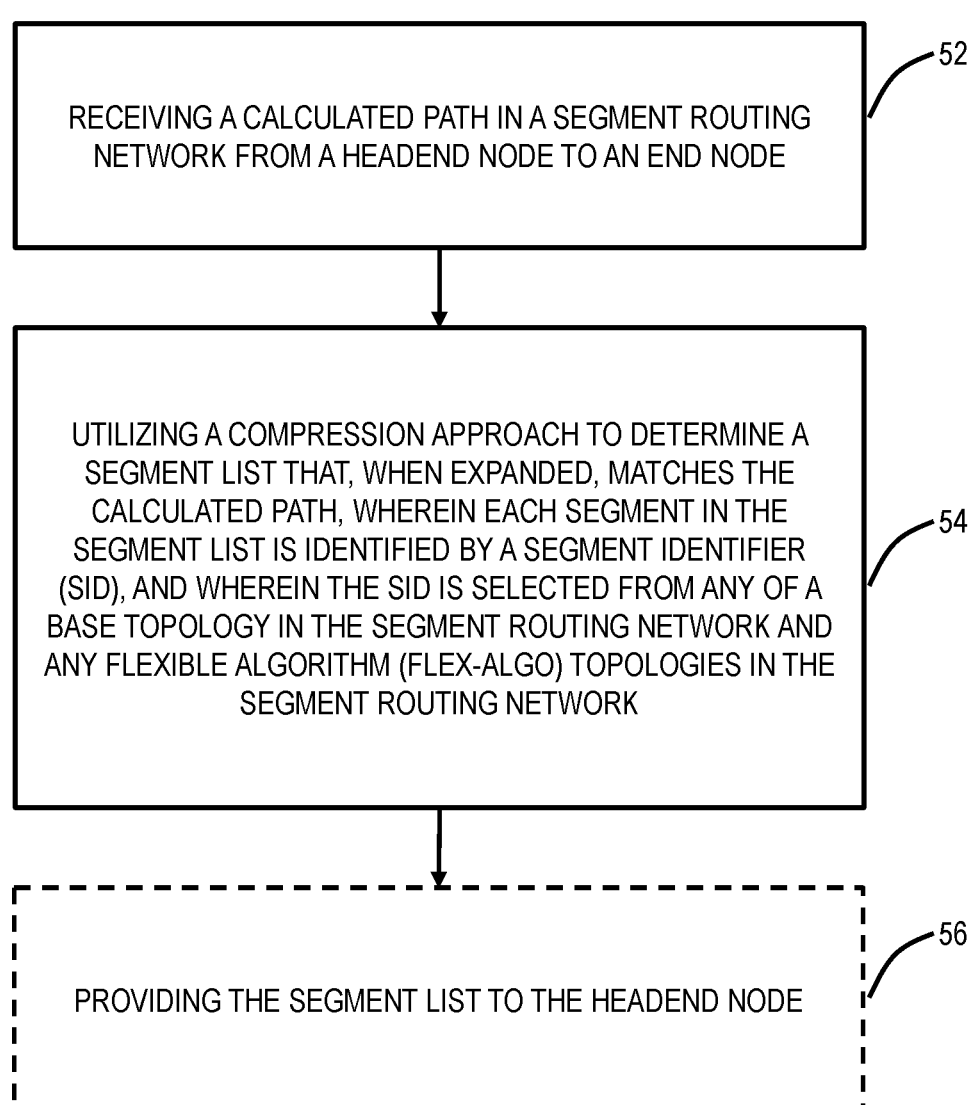
FIG. 2 is a process for SID list compression according to an embodiment of the present disclosure.

FIG. 2 is a process 50 for SID list compression according to an embodiment of the present disclosure. The process 50 can be realized as a method having steps; via an apparatus such as a processing system disposed in, associated with, or connected to a router, with the processing system including at least one processor configured to implement the steps; and as a non-transitory computer-readable medium storing instructions that, when executed by at least one processor, cause the at least one processor to implement the steps. From a terminology perspective, the terms segment and SID are used somewhat interchangeably, but those skilled in the art recognize a SID is a label or identifier that corresponds to a segment.

The process 50 includes receiving a calculated path in a Segment Routing network from a headend node to an end node (step 52); and utilizing a compression approach to determine a segment list that, when expanded, matches the calculated path, wherein each segment in the segment list is identified by a Segment Identifier (SID), and wherein the SID is selected from any of a base topology in the Segment Routing network and any Flexible Algorithm (Flex-Algo) topologies in the Segment Routing network (step 54). The process 50 can further include providing the segment list to the headend node (step 56). The process 50 can further include, prior to the receiving, calculating the calculated path from the headend node to the end node based one or more constraints for a given purpose, wherein SIDs are selected after the calculated path is determined without regard to any purpose of the any Flex-Algo topologies.

The segment list can include at least two SIDs from different Flex-Algo topologies of the any Flex-Algo topologies. Also, the segment list can include at least two SIDs from a Flex-Algo topology of the any Flex-Algo topologies and from the base topology. The compression approach can select node SIDs from different Flex-Algo topologies of the any Flex-Algo topologies independently during each iteration. If it is not possible for the compression approach to select a node SID in a given iteration, the compression approach can select an adjacency SID. The compression approach can be a greedy approach that selects a node SID from among all topologies that traverses furthest along the calculated path during each iteration. The compression approach can be a thorough approach that selects a node SID from among all topologies in all possible combinations to traverse along the calculated path during each iteration.

The process 50 does not concern itself with why the network operator has configured multiple Flex-Algo topologies in their network. It also does not concern itself with how paths are calculated using the base topology or those different Flex-Algo topologies. It further does not concern itself with how or for what purpose these Flex-Algo topologies were constructed, and whether their constraints or metric match the constraints and metrics desired by calculated path. If these different Flex-Algo topologies already exist, however, and contain node SIDs that can be used to forward traffic via different Flex-Algo topologies, then the PCE should attempt to pick node SIDs from these diverse flex-algo topologies to shorten the segment list depth.

Example Node

FIG. 3 is a block diagram of a router 100, depicted in a simplified functional format. It is important to note that a more practical design of this router would likely include additional components and processing logic to accommodate standard operating features, which are not detailed here. The router 100 may represent any network element compatible with Segment Routing, and includes various interconnected modules, such as modules 102 and 104, via an interface 106. These modules, also known as blades or line cards, are typically mounted on the chassis of a data switching device. Each module can house numerous electronic or optical devices on a circuit board, complete with various interconnects, including interfaces to the chassis itself.

Specifically, the diagram illustrates two types of modules: line modules 102, which feature multiple Ethernet ports for external connections, and a control module 104. The line modules facilitate data traffic switching between ports via a switching fabric, integrated across the modules, potentially centralized in a separate unit or module, as well as a combination. This switching fabric includes hardware, software, and firmware that routes incoming data to the appropriate port. The control module 104 is equipped with a microprocessor, memory, software, and a network interface to manage operations such as configuration and monitoring of the router 100. It may also communicate with external network management systems or databases that handle provisioning and operational data.

Lastly, while FIG. 3 provides a basic view, those skilled in the art will understand that the router 100 could include additional components or be configured differently, such as in a distributed arrangement or as an integrated, rack-mounted unit (often referred to as a "pizza-box" configuration). This depiction in FIG. 3 is intended to convey functional aspects, with actual hardware implementations varying widely.

Example Processing Device

FIG. 4 is a block diagram of an example processing device 200. The processing device 200 may be integrated within the router 100 or function as a standalone unit connected to the router 100, including the PCE 30 and the SDN controller 20. It may also be known as a control module, shelf controller, shelf processor, or system controller. The core of the processing device 200 is a processing unit 202, a hardware unit that runs software instructions. The processing unit 202 could be one or more custom or commercially available processors. During operation, the processing unit 202 executes software from memory, manages data communication with the memory, and controls the processing device 200 operations based on the software.

The processing device 200 also features several components connected to the processing unit 202: a network interface 204, a data store 206, memory 208, and an I/O interface 210. The network interface 204, possibly an Ethernet device, allows the processing device 200 to communicate over a data network and includes necessary connections for address, control, and data communication. The data store 206 stores various types of data such as control plane information and Operations, Administration, Maintenance, and Provisioning (OAM&P) data, and may include both volatile (e.g., RAM) and nonvolatile (e.g., ROM, hard drives) memory elements. Similarly, the memory 208 includes volatile and nonvolatile storage media, potentially employing a distributed architecture where components are located remotely but accessible by the processing unit 202. The I/O interface facilitates communication between processing device 200 and external devices.

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

CONCLUSION

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments. Also, in the claims, the terms "comprise," "comprises," "comprising," "include," "includes," and "including" are intended to be non-limiting and open-ended. These terms specifically list essential elements or steps but do not exclude additional elements or steps. This applies even when a claim or series of claims includes more than one of these terms.

What is claimed is:

1. A non-transitory computer-readable medium storing instructions that, when executed, cause one or more processors to execute steps of:

receiving a calculated path in a Segment Routing network from a headend node to an end node; and utilizing a compression approach to determine a segment list that, when expanded, matches the calculated path, wherein each segment in the segment list is identified by a Segment Identifier (SID), and wherein each SID is selected from any of a base topology in the Segment Routing network and any Flexible Algorithm (Flex-Algo) topologies in the Segment Routing network, wherein the compression approach iteratively selects, from among the Flex-Algo topologies, a SID whose shortest-path-first expansion matches a corresponding subpath of the calculated path.

2. The non-transitory computer-readable medium of claim 1, wherein the steps further include providing the segment list to the headend node.

3. The non-transitory computer-readable medium of claim 1, wherein the steps further include prior to the receiving, calculating the calculated path from the headend node to the end node based one or more constraints for a given purpose, wherein SIDs are selected after the calculated path is determined without regard to any purpose of the any Flex-Algo topologies.

4. The non-transitory computer-readable medium of claim 1, wherein the segment list includes at least two SIDs from either (1) different Flex-Algo topologies of the any Flex-Algo topologies or (2) from a Flex-Algo topology of the any Flex-Algo topologies and from the base topology.

5. The non-transitory computer-readable medium of claim 1, wherein the compression approach selects node SIDs from different Flex-Algo topologies of the any Flex-Algo topologies independently during each iteration.

6. The non-transitory computer-readable medium of claim 5, wherein, if it is not possible for the compression approach to select a node SID in a given iteration, the compression approach selects an adjacency SID.

7. The non-transitory computer-readable medium of claim 1, wherein the compression approach is a greedy approach that selects a node SID from among all topologies that traverses furthest along the calculated path during each iteration.

8. The non-transitory computer-readable medium of claim 1, wherein the compression approach is a thorough approach that selects a node SID from among all topologies in all possible combinations to traverse along the calculated path during each iteration.

9. A method comprising steps of:

receiving a calculated path in a Segment Routing network from a headend node to an end node; and utilizing a compression approach to determine a segment list that, when expanded, matches the calculated path, wherein each segment in the segment list is identified by a Segment Identifier (SID), and wherein the SID is selected from any of a base topology in the Segment Routing network and any Flexible Algorithm (Flex-Algo) topologies in the Segment Routing network, wherein the compression approach iteratively selects, from among the Flex-Algo topologies, a SID whose shortest-path-first expansion matches a corresponding subpath of the calculated path.

10. The method of claim 9, wherein the steps further include providing the segment list to the headend node.

11. The method of claim 9, wherein the steps further include prior to the receiving, calculating the calculated path from the headend node to the end node based one or more constraints for a given purpose, wherein SIDs are selected after the calculated path is determined without regard to any purpose of the any Flex-Algo topologies.

12. The method of claim 9, wherein the segment list includes at least two SIDs from either (1) different Flex-Algo topologies of the any Flex-Algo topologies or (2) from a Flex-Algo topology of the any Flex-Algo topologies and from the base topology.

13. The method of claim 9, wherein the compression approach selects node SIDs from different Flex-Algo topologies of the any Flex-Algo topologies independently during each iteration.

14. The method of claim 9, wherein the compression approach is a greedy approach that selects a node SID from among all topologies that traverses furthest along the calculated path during each iteration.

15. The method of claim 9, wherein the compression approach is a thorough approach that selects a node SID from among all topologies in all possible combinations to traverse along the calculated path during each iteration.

16. An apparatus comprising:

one or more processors; and memory storing instructions, when executed, cause the one or more processors to receive a calculated path in a Segment Routing network from a headend node to an end node, and utilize a compression approach to determine a segment list that, when expanded, matches the calculated path, wherein each segment in the segment list is identified by a Segment Identifier (SID), and wherein the SID is selected from any of a base topology in the Segment Routing network and any Flexible Algorithm (Flex-Algo) topologies in the Segment Routing network, wherein the compression approach iteratively selects, from among the Flex-Algo topologies, a SID whose shortest-path-first expansion matches a corresponding subpath of the calculated path.

17. The apparatus of claim 16, wherein the instructions, when executed, further cause the one or more processors to provide the segment list to the headend node.

18. The apparatus of claim 16, wherein the instructions, when executed, further cause the one or more processors to prior to the calculated path being received, calculate the calculated path from the headend node to the end node based one or more constraints for a given purpose, wherein SIDs are selected after the calculated path is determined without regard to any purpose of the any Flex-Algo topologies.

19. The apparatus of claim 16, wherein the segment list includes at least two SIDs from either (1) different Flex-Algo topologies of the any Flex-Algo topologies or (2) from a Flex-Algo topology of the any Flex-Algo topologies and from the base topology.

20. The apparatus of claim 16, wherein the compression approach selects node SIDs from different Flex-Algo topologies of the any Flex-Algo topologies independently during each iteration.

* * * * *